United States Patent

3,556,819
Patented Jan. 19, 1971

3,556,819
ASPHALTIC BASED FIRE-RESISTANT COMPOSITIONS UTILIZING VERMICULITE ORE INTUMESCING AGENT
Russell E. Koons, St. Louis, Mo., assignor to Monsanto Company, St. Louis, Mo., a corporation of Delaware
No Drawing. Filed Mar. 14, 1968, Ser. No. 712,959
Int. Cl. C09k 3/28
U.S. Cl. 106—15        5 Claims

ABSTRACT OF THE DISCLOSURE

Fire-resistant asphaltic compositions are made by combining:
(a) asphalt having a penetration of from 0 to 50 mm./10 at 77° F. and a softening point of from 150 to 300° F.;
(b) a noncombustible fibrous material such as asbestos or fiber glass;
(c) a finely divided porous aggregate such as perlite or ground foamed polyurethane;
(d) a finely divided heat-fusible material such as borax glass or boric acid;
(e) a vermiculite ore intumescing agent; and
(f) a solvent for the asphalt to lower viscosity of the composition to a point where it can be applied to a surface.

BACKGROUND OF THE INVENTION

This invention relates to a composition of matter containing bituminous materials. In one aspect, this invention relates to new asphaltic compositions having improved fire resistance. In another aspect, this invention relates to new asphaltic compositions that are particularly suited for use as protective coatings that protect surfaces from damage caused by fires. In still another aspect, this invention relates to methods for protecting surfaces from fire damage by applying asphaltic compositions.

Asphaltic mastic compositions have found wide acceptance as protective coatings for various surfaces. In recent years asphaltic mastic compositions have been utilized to protect surfaces from the effects of weather and corrosive vapors while also insulating such surfaces. The asphalt mastic compositions generally employed at the present do not themselves provide any fire hazard but, in most instances, will ignite or contribute fuel when exposed to intense heat such as is experienced in industrial fires. It has also been found that most asphalt mastic materials tend to disbond from various surfaces when exposed to intense heat from industrial fires, thereby exposing the bare surface to the open flame. Thus, while the presently used asphalt mastic materials offer considerable protection from corrosion and weathering, they are of little or no value in protecting the surfaces from fire damage when exposed to accidental industrial fires.

It is an object of this invention to provide improved asphaltic compositions. Another object of this invention is to provide asphaltic compositions having improved fire-resistant properties. Still another object of this invention is to provide asphaltic compositions having improved fire resistance while being suited for use as protective coatings.

Still another object is to provide improved asphaltic compositions that are suitable for insulating surfaces that will withstand the effects of accidental fires without disbonding from the surface. Yet another object of this invention is to provide a method for protecting surfaces from the effects of accidental fires.

Additional aspects, advantages and objects of this invention will be apparent to those skilled in the art upon examination of this specification and the claims.

SUMMARY OF THE INVENTION

It has been found that the above objects are fulfilled by combining a specific asphalt with various filler materials and a solvent to lower the viscosity of the composition to a point where the composition can be applied to a surface.

Broadly speaking, the asphaltic compositions of my invention are a combination of:
(a) From 15 to 35 parts by weight asphalt having a penetration of from 0 to 50 mm./10 at 77° F. and a softening point of from 150 to 300° F.;
(b) From 0.5 to 10 parts by weight noncombustible fibrous material;
(c) From 5 to 20 parts by weight finely divided porous aggregate;
(d) From 5 to 15 parts by weight finely divided heat fusible material that fuses in the range of about 200 to 1000° F.;
(e) From 0.5 to 10 parts by weight intumescing agent, and;
(f) Sufficient solvent for said asphalt to lower the viscosity of said composition to a point where the composition can be applied to a surface.

DESCRIPTION OF PREFERRED EMBODIMENTS

In preparing the fire-resistant asphaltic composition of this invention, it is desirable that the asphalt be combined with the various fillers in proportions such that the resulting composition provides a coating for the surface that will prevent substantial corrosion from weather and corrosive vapors. It is also desirable that the fillers be added to the asphalt in such proportions that the resulting composition will not fracture or disbond from the surface under normal temperature fluctuations. It is most important that the fillers be added to the composition in proportions such that the resulting composition will not become fluid and disbond from the surface when it is exposed to open flames, such as those encountered in accidental fires. It is also important to add the fillers in such proportions that the coating composition will form a hard, tough, charred ash after being exposed to open flames.

The asphalt that is used in the compositions of my invention should have a penetration of from about 0 to about 50 mm./10 at 77° F. and a softening point of from about 150 to about 300° F. Preferably, the asphalt used in the compositions of my invention will have a penetration of from about 5 to 40 mm./10 at 77° F. and a softening point of from about 150 to about 300° F. Asphalts having these properties may be obtained by the vacuum reduction, solvent treatment, air-blowing or a combination of these steps of the residuum from the "topping" of a crude petroleum. This residuum material is generally known as a topped crude oil and is that which remains after the distillation of crude petroleum to remove gas, gasoline, naphthas, kerosene, distillates or diesel oil and gas oil therefrom.

The preferred asphalts that are used in the present invention are those which have been obtained by solvent extraction of petroleum residuum to obtain an asphalt which is subsequently air-blown. Air-blowing techniques are well-known in the art for lowering the penetration and increasing the softening point of asphalts. Such air-blowing can be either catalytic or non-catalytic.

It is within the scope of my invention to utilize a very hard, or low-penetration asphalt that has been plasticized with various known asphalt plasticizers. Thus, in one embodiment of my invention, an asphalt having the preferred penetration of from 5 to 40 mm./10 at 77° F., is made by air-blowing an asphalt to an essentially zero penetration value at 77° F., followed by the addition of asphalt plasticizers to bring the penetration value to within the preferred range.

When the asphalt starting material is prepared by plasticizing a very hard, low-penetration asphalt, various known plasticizers can be utilized. Non-limiting examples of such plasticizers are Aroclor 1248, 1254 and 1260 (registered trademarks) marketed by Monsanto Company, which are halogenated organic compounds. Other plasticizers include tricresyl phosphate, triphenyl phosphate, cresyldiphenyl phosphate, tri-o-chlorophenyl phosphate, tris(2,3-dibromopropyl)phosphate, and the like. The foregoing plasticizers not only function to plasticize the very hard, low-penetration asphalts, but also function as flame or fire-retardant chemicals. Thus, when the above-mentioned plasticizers are utilized in preparing the fire-resistant asphalt compositions of my invention, the flammability of the composition is retarded by their presence.

In preparing the fire-resistant asphalt compositions of my invention, the method for ultimately applying the compositions to various surfaces governs the type and amount of asphalt solvent that must be present in the composition. If the composition is to be applied by troweling it onto a surface, the composition may be a stiff, buttery consistency; and very little solvent need be added. On the other hand, if the material is to be sprayed on the surface to be covered, a considerable amount of solvent must be added to lower the viscosity of the composition to a point where it can be readily sprayed.

Various solvents for the asphalt can be utilized in preparing the compositions of my invention. Organic solvents such as petroleum naphtha, kerosene and the like can be used if it is not necessary to have a composition that is self-extinguishing in the uncured stage. Various aromatic solvents such as benzene, toluene and the like can be utilized in preparing the compositions of my invention. If it is desired to have an asphaltic composition that is self-extinguishing in the uncured state, various halogenated materials such as perchloroethylene can be utilized as solvents. It is, of course, understood that mixtures of the foregoing solvents can be used in producing the asphaltic composition of my invention having the desired viscosity characteristics.

Usually, it is desirable to utilize solvents boiling up to about 450° F. for preparing the compositions of my invention. Care must be exercised in choosing solvents that will evaporate from the applied composition without causing a blistered effect in the cured coating. If the solvent is too volatile, it may tend to evaporate at a higher rate than the vapors can be transmitted through the drying film, thereby causing bubbles and blisters to form in the applied coating. The proper selection of the solvent to be utilized in my invention is well within the skill of the art.

The fire-resistant compositions of my invention include a non-combustible fibrous material. This fibrous material strengthens the cured composition and tends to hold the coating together when it becomes softened by heat. It has been found that the fibrous materials strengthen the coating and keep it from disbonding from the protected surface during the early stages of a fire, when the asphalt starts to soften, prior to a charring of the asphalt component. Care must be taken to add sufficient fibrous material to the composition to give the cured material strength in the early stages of a fire. However, if an excessive amount of the material is added to the composition, the ash may tend to curl and pull away from the surface as it becomes charred.

Various non-combustible fibrous materials can be utilized in accordance with my invention. Nonlimiting examples of such fibrous materials include fibrous asbestos, fiber glass, rock wool, and the like. The preferred fibrous material is asbestos fiber. Preferably, the asbestos fiber will be 7M or 7T grade, under the Canadian chrysolite asbestos classification. The asbestos fiber is graded on a Quebec standard testing machine comprising a series of superimposed boxes having screens with varying meshes (see Canadian Department of Mines bulletin No. 707, 1931; and U.S. Bureau of Mines bulletin No. 403 on asbestos, 1937).

The fire-resistant compositions of my invention also contain a finely divided porous aggregate material. The preferred aggregates are light-weight materials such as expanded vermiculite, cork, ground foamed polyurethane, perlite (expanded volcanic glass) and the like. It is preferred that the porous aggregate material be of a size such that all of the particles pass through an 8-mesh screen with at least 90% of the material being retained on a 100-mesh screen.

By using the expanded, light-weight porous aggregates, a considerable amount of insulation of the protected surface from an open flame is obtained.

In preparing the fire-resistant compositions of my invention, it is also necessary to include an intumescing agent. The intumescing agent expands as the fire-resistant composition is heated, as would occur during a fire. The expansion of the intumescing agent prevents the fire-resistant composition from developing cracks and disbonding from the surface to be protected as charring takes place during the fire. Without incorporation of the intumescing agent, the charred surface would shrink, thereby causing considerable cracks and disbonding during exposure to flames. Any intumescing agent that will expand under conditions such as those experienced when the fire-resistant composition is exposed to a flame can be used. A preferred intumescing agent is vermiculite ore. The vermiculite ore should be finely divided and it is preferred that all of the particles pass through an 8-mesh screen with at least 90% of the particles being retained on a 100-mesh screen.

An essential ingredient in the composition of my invention is a material that fuses at a temperature in the range of about 200 to 1000° F. to a viscous mass. The purpose for utilizing the heat-fusible material in the asphalt compositions of my invention is to strengthen and cement the particles of the charred mastic material during and after exposure to flame. Asphalt mastic materials, made in accordance with the prior art, develop a fragile charred ash when they are exposed to flames.

In providing coating compositions for protecting various surfaces from the damage of fire, it is necessary that the coating compositions be strong enough to withstand a mechanical force of a stream of water from a fire hose or other such apparatus that may be encountered in fire fighting of industrial fires. If the resulting ash from a charred fire-resistant mastic material is not strong enough to withstand such forces, the entire coating material is very easily separated from the surface that it is applied to, thereby exposing it to further damage by the flames.

The fire-resistant asphalt compositions of my invention have materials incorporated therein that fuse to a viscous mass under the conditions normally experienced in industrial fires, thereby increasing the strength of the charred material by cementing the particles of the coating composition. Normally, the materials will produce a very viscous melt at high temperatures, such as experienced on exposure of the composition to industrial fires, thereby holding the charred ash together. Many heat fusible materials that fuse in the temperature range of about 200 to 1000° F. can be utilized in the compositions according to my invention. Nonlimiting examples of such materials are boric acid, boric oxide, borax glass borax, and the like. It is preferred that the heat fusible material be of a size such that all of the particles pass through an 8-mesh screen with at least 90% of the particles being retained on a 100-mesh screen.

The preferred fire-resistant asphalt compositions of my invention are made by intimately admixing the above-mentioned materials in the following proportions:

(a) From 20 to 30 parts by weight of asphalt;
(b) From 1 to 5 parts by weight of the noncombustible fibrous material;
(c) From 7 to 12 parts by weight of the finely divided porous aggregate;
(d) From 7 to 12 parts by weight of the heat-fusible material;
(e) From 1 to 5 parts by weight of the intumescing agent; and
(f) Sufficient solvent for the asphalt to lower the viscosity of the composition to the point where the composition can be applied to a surface.

In addition to the foregoing essential components, various additional materials can be incorporated in the fire-resistant asphalt compositions of my invention. These other nonessential ingredients include various inert fillers, emulsifiers and water.

In some instances, it may be desirable to incorporate other inert fillers into the fire-resistant asphalt composition of my invention. Such fillers include slate flour, spent refinery clay, and the like. Such fillers give the asphaltic composition "body" while mildly reinforcing the cured composition. Whenever these fillers are utilized, it is preferred that they be incorporated into the composition in a finely divided state. Preferably, the particle size of the inert fillers will be such that all of the particles pass through an 8-mesh screen. Based on the above proportions for the various essential ingredients, these optional inert fillers will generally be present in amounts of less than 10 parts by weight.

I have found that when the fire-resistant asphalt compositions of my invention are formulated and not used immediately, it may be desirable to add various components to stabilize the mixture. Without such stabilizing components, it has been found that the asphalt compositions may tend to separate as a result of the various fillers settling in the storage vessel with the asphalt solvent rising to the top of the composition. Such a separation requires a remixing of the materials prior to the application of the asphalt composition to the surface to be protected.

The separation tendencies of the asphalt compositions can be reduced materially by forming an emulsion of water and the asphalt composition. Generally, it is not necessary to add more than 25 parts by weight of water per 100 parts by weight of the total asphalt composition to achieve the desired stability of the fire-resistant asphalt composition upon prolonged storage. Preferably, less than 15 parts by weight of water per 100 parts by weight of the total asphalt composition is added to stabilize it during prolonged storage periods.

When water is added to the fire-resistant asphalt composition to improve its storage characteristics, it is desirable to also utilize an emulsifying agent to aid in forming the desired stabilized emulsion. Many surface active agents can be utilized as the emulsifying agent. Preferred emulsifying agents include alkyd-substituted aryl sulphonic acids and various aliphatic diamine surface active agents. However, the proper selections of emulsifying agents and the amount necessary for forming the desired emulsion are well within the skill of the art.

In some applications of the fire-resistant asphalt compositions of my invention, it may be desirable to produce elastic and flexible cured coatings. In such applications, the elasticity and flexibility of the cured coating compositions may be improved by the incorporation of small amounts of various rubbery polymers into the compositions prior to applying them to the surface to be protected. One convenient method for incorporating such polymers into the asphalt compositions of my invention is by use of a rubber latex. Rubber latices of polybutadiene, butadiene-styrene copolymers, neoprene, polyvinylchloride, and the like, can be utilized. Again, the proper selection of rubbery polymers to be added to the asphalt compositions of my invention is within the skill of the art. When rubbery polymers are used in the compositions of my invention, they will generally be present in amounts of less than 5 parts by weight, based on the above proportions for the essential ingredients.

The asphalt compositions of my invention can be utilized for protecting many different types of surfaces from the damage of fire. The asphalt compositions of my invention are especially useful for protecting various fractionation and storage vessels in chemical plants and petroleum refineries. The asphalt compositions of my invention can be applied to such vessels to function as a protective coating for the metal surface from weather and from corrosive vapors while affording substantial protection from the damage of accidental fires.

In order to further illustrate the advantages of my invention, the following examples are presented. The various materials, proportions and compounding conditions, set forth in the examples are typical only and should not be construed to limit my invention unduly.

In the following examples, as well as in the preceding specifications, penetration values for the asphalt are determined at 77° F., by the procedure set forth in ASTM D-5-65, and softening point values are determined by the procedures set forth in ASTM D-36-64T (ring and ball method).

In evaluating the fire-resistant compositions in the following examples, a small plate disbonding test is utilized. The test is carried out by applying the asphalt compositions to be tested to cold rolled steel plates of 35 mil thickness steel. The steel panels are sanded lightly with 4/0 aluminum oxide paper prior to the application of the asphalt compositions to the surface. The steel panels have dimensions of 2¾" by 5⅞". Masking tape is applied to the steel panels so as to leave an area of 2¾" by 2¾" bare on the center of the steel panels for the application of the asphalt composition to be tested. The asphalt compositions are applied by spreading with a spatula (unless otherwise noted) to a thickness of ⅜". When the asphalt composition has partially cured, the masking tape is removed to leave the coating material with bare steel surfaces bordering it on each side. The asphalt coating composition is then cured in a forced draft oven at 140° F. for 15 days.

After curing the test panels, the characteristics of the asphalt compositions are determined by placing the test panels on a steel support rack above a laboratory Fisher burner. The test panels are positioned such that the coating to be tested is on the underside of the supported steel panel and is 1" above the top of the burner.

The burner is attached to a rotameter and the rotameter is adjusted to provide 0.140 to 0.145 cu. ft. of natural gas per minute to the burner. At zero time, the lighted burner is placed under the test panels in such a manner that the hot gases from the burner contact the asphalt coating and visual observations of the coating are continuously made. In order for the coating to satisfactorily pass the small plate disbonding test, it must not disbond from the steel plate for 30 minutes exposure to the flame.

EXAMPLE I

A series of tests is carried out to illustrate the advantages of the asphalt compositions of my invention, utilizing the above-described small plate disbonding test. The asphalt utilized in this first series of tests is an asphalt made by propane extraction of a topped south Arkansas crude oil that has been air-blown to a penetration of 1 (mm./10) and a softening point of 237. The following table sets forth the recipes utilized in this series of runs:

| Run | Parts by weight | | | | | | |
|---|---|---|---|---|---|---|---|
| | A | B | C | D | E | F | G |
| Component: | | | | | | | |
| Asphalt | 20 | 30 | 20 | 20 | 20 | 20 | 20 |
| 7M asbestos[1] | 2.5 | 2.5 | 0 | 2.5 | 2.5 | 2.5 | 2.5 |
| Expanded vermiculite[1] | 10 | 10 | 10 | 0 | 10 | 10 | 10 |
| Boric acid[1] | 8 | 8 | 8 | 8 | 0 | 8 | 1 |
| Vermiculite ore[1] | 3 | 3 | 3 | 3 | 3 | 0 | 3 |
| Petroleum naphtha[2] | 10 | 15 | 10 | 10 | 10 | 10 | 10 |

[1] 20/60 mesh.
[2] Boiling range 306–360° F.

The asphalt coating compositions in Runs A and B pass the small plate disbonding test without disbonding during the 30-minute exposure to the flame. The charred coating is free of cracks and does not crumble or disbond when tapped with a spatula. The coating composition of Run C, without asbestos fiber, disbonds after three minutes exposure to the flame and falls from the underside of the test panel. The coating composition of Run D blisters and begins to disbond after 10 minutes exposure to the flame. At the end of the 30-minute test period, the coating composition of Run D is approximately 30% disbonded from the steel test panel. The coating composition of Run E does not disbond during the 30-minute exposure to the flame; however, the charred ash is very weak and friable and crumbles easily when touched with a spatula. The coating composition tested in Run F develops severe cracking and is 40% disbonded after 30 minutes of exposure to the flame. The coating composition of Run G does not disbond during the test period but the charred surface is very weak and friable at the end of 30-minutes' exposure to the flame.

EXAMPLE II

A second series of runs is carried out utilizing the exact same recipe as shown above in Example I except that the asphalt component is made by the vacuum reduction of a south Arkansas crude. The asphalt component has a penetration of 30 and a softening point of 225° F. The coating compositions in each of the runs of this second series have essentially the same physical characteristics of the corresponding components of Example I.

EXAMPLE III

Run A of Example I is repeated except that borax is used in place of boric acid. This coating composition passes the small plate disbonding test with no disbonding after 30-minutes exposure to the flame. The charred surface of the coating composition is free of cracks and does not shatter when tapped with a spatula.

EXAMPLE IV

Run B of Example I is repeated except that perlite (an expanded volcanic glass) having a mesh size of 20/60 is used instead of expanded vermiculite. The coating composition does not disbond during the 30-minute small plate disbonding test. The charred surface of the coating composition is strong and free of cracks.

EXAMPLE V

A run is carried out to illustrate the effectiveness of fire-retardant asphalt compositions of my invention having slate flour incorporated therein. The asphalt component is the same as used in Example I. The recipe for the asphalt composition is as follows:

Component—Parts by weight
```
Asphalt ----------------------------------- 25
7M asbestos ------------------------------- 3
Expanded vermiculite (20/60 mesh) --------- 8
Boric acid (20/60 mesh) ------------------- 3.5
Vermiculite ore (20/60 mesh) -------------- 3.5
Slate flour (−325 mesh) ------------------- 3.5
Solvent[1] -------------------------------- 15
```
[1] Mixture of 66.6% petroleum naphtha (boiling range 306–360° F.) and 33.3% highly aromatic solvent (boiling range 320–350° F.).

The asphalt coating composition passes the small plate disbonding test with no disbonding after 30-minutes exposure to the flame. The resulting ash is strong and free of cracks. No damage to the surface of the charred coating composition is observed when it is tapped with a spatula.

EXAMPLE VI

A run is carried out utilizing an emulsion type fire-resistant asphalt composition that produces a more flexible cured mastic than that of Example I. The asphalt component utilized in this run is the same as the asphalt component of Example I. In this run, tricresyl phosphate is added to the asphalt to plasticize it. The various components of the recipe are compounded in the order that they appear in the table:

Component—Parts by weight
```
Asphalt ----------------------------------- 25
Solvent[1] -------------------------------- 30
Tricresyl phosphate ----------------------- 3.5
Duomeen T[2] ------------------------------ 0.5
Expanded vermiculite (20/60 mesh) --------- 10
Slate flour (−325 mesh) ------------------- 3.5
Water ------------------------------------- 12.5
Rubber latex[3] --------------------------- 1
Boric acid (20/60 mesh) ------------------- 8
Vermiculite ore --------------------------- 3.5
7M asbestos ------------------------------- 3
```
[1] Mixture of 66.6% petroleum naphtha (boiling range 306–360° F.) and 33.3% highly aromatic solvent (boiling range 320–350° F.)
[2] Registered trademark of a surface active agent which is an aliphatic diamine containing a primary and secondary amine group of the formula RNHCH$_2$CH$_2$CH$_2$NH$_2$ where R is an alkyl group.
[3] A rubber latex of butadiene-styrene GRS-type copolymer wherein the solids content is 65% and the bound styrene is 25%.

The cured coating composition is relatively flexible due to the incorporation of the rubber latex into the coating composition. In this case, the coating composition is applied to the test panels by spraying instead of troweling. The cured coating composition passes the 30-minute small plate disbonding test with no disbonding. The charred ash is strong and will not crack when tapped with a spatula.

EXAMPLE VII

A small sample of the composition made by the recipe of Example V is placed in a closed container at room temperature for three weeks. At the end of the three-week period, the container is opened and considerable amount of dark liquid is observed on top of the solid components in the container.

A small sample of the composition made by the recipe of Example VI is placed in a closed container and left at room temperature for three weeks. At the end of the three-week period, the container is opened and no separation of the solvent from the solids is noted.

As will be apparent to those skilled in the art from the above specification, various modifications can be made without departing from the spirit and scope of my invention.

I claim:
1. A fire-resistant composition consisting essentially of:
   (a) from 20 to 30 parts by weight asphalt having a penetration of from about 0 to about 50 mm./10 at 77° F. and a softening point of from about 150 to 300° F.;
   (b) from 1 to 5 parts by weight noncombustible fibrous material selected from the group consisting of 7T grade asbestos, 7M grade asbestos, fiber glass, and rock wool;
   (c) from 7 to 12 parts by weight of porous aggregate selected from the group consisting of expanded vermiculate, cork, ground foamed polyurethane and perlite;
   (d) from 7 to 12 parts by weight of a heat fusible material that fuses in the range of about 200 to 1000° F. selected from the group consisting of boric acid, boric oxide, borax glass, and borax;
   (e) from 1 to 5 parts by weight vermiculate ore intumescing agent; and
   (f) sufficient solvent for said asphalt to lower the viscosity of said composition to a point where said composition can be applied to a surface, said solvent boiling up to 450° F.; wherein the particle size distributions of components (c), (d) and (e) are such that all particles pass through an 8 mesh screen and at least 90 percent are retained on a 100 mesh screen.

2. The composition of claim 1 wherein said fibrous material is 7T or 7M grade asbestos.

3. The composition of claim 1 wherein said asphalt is prepared by blending an asphalt having a low penetration with an asphalt plasticizer to produce a plasticized asphalt having a penetration of from 5 to 40 mm./10 at 77° F.

4. The composition of claim 3 wherein said plasticizer is tricresyl phosphate.

5. The composition of claim 1 wherein said fibrous material is 7T or 7M grade asbestos; said finely divided aggregate is expanded vermiculite; said heat fusible material is boric acid and said intumescing agent is vermiculite ore.

References Cited

UNITED STATES PATENTS

| | | | |
|---|---|---|---|
| 2,542,721 | 2/1951 | Stafford | 106—15 |
| 2,569,399 | 9/1951 | Burns et al. | 106—15 |
| 2,594,937 | 4/1952 | Lauring | 106—15 |
| 2,756,159 | 7/1956 | Kendall et al. | 106—15 |
| 2,923,639 | 2/1960 | Wilkinson | 106—282 |
| 3,053,714 | 9/1962 | Edwards | 106—15 |
| 3,342,614 | 9/1967 | Koons | 106—15 |
| 3,378,381 | 4/1968 | Draganov | 106—15 |
| 3,438,847 | 4/1969 | Chase | 106—15 |
| 3,475,199 | 10/1969 | Wolf | 106—15 |
| 3,455,850 | 7/1969 | Saunders | 260—2.5 |
| 3,470,016 | 9/1969 | Biles et al. | 260—28.5 |
| 3,510,323 | 5/1970 | Wismer et al. | 260—2.5 |

FOREIGN PATENTS

| | | | |
|---|---|---|---|
| 624,479 | 7/1961 | Canada | 106—15 |
| 644,504 | 7/1962 | Canada | 106—15 |

JULIUS FROME, Primary Examiner

J. H. MILLER, Assistant Examiner

U.S. Cl. X.R.

106—280, 281; 260—2.5, 28.5

PO-1050
(5/69)

UNITED STATES PATENT OFFICE
CERTIFICATE OF CORRECTION

Patent No. U. S. 3,556,819      Dated January 19, 1971

Inventor(s) Russell E. Koons, St. Louis, Mo.

It is certified that error appears in the above-identified patent and that said Letters Patent are hereby corrected as shown below:

Column 1, Line 23, "boxax" should be -- borax --.

Column 5, Line 73, "alkyd" should be -- alkyl --.

Column 8, Line 6 (Page 15, line 11 of original application)

"8" should be -- 10 --.

Column 8, Line 7 (Page 15, line 12 of original application)

"3.5" should be -- 8 --.

Signed and sealed this 8th day of June 1971.

(SEAL)
Attest:

EDWARD M. FLETCHER, JR.
Attesting Officer

WILLIAM E. SCHUYLER, JR
Commissioner of Patents